United States Patent [19]

Saito et al.

[11] Patent Number: 5,014,185

[45] Date of Patent: May 7, 1991

[54] LOOP CONTROL APPARATUS

[75] Inventors: Takashi Saito; Hideyuki Fujiwara; Kenji Kubo, all of Kanagawa, Japan

[73] Assignee: Japan Tobacco, Inc., Japan

[21] Appl. No.: 325,831

[22] Filed: Mar. 20, 1989

[30] Foreign Application Priority Data

Apr. 27, 1988 [JP] Japan ................................. 63-102587

[51] Int. Cl.$^5$ ............................................. G06F 15/46
[52] U.S. Cl. .................................. 364/188; 364/189; 364/191
[58] Field of Search ................ 364/200, 900, 146, 147, 364/162, 148, 157, 188, 189, 191, 192, 162

[56] References Cited

U.S. PATENT DOCUMENTS

| | | | |
|---|---|---|---|
| 4,528,623 | 7/1985 | Tachibana | 364/191 |
| 4,542,452 | 9/1985 | Fukai et al. | 364/141 |
| 4,639,852 | 1/1987 | Motomiya | 364/138 |
| 4,736,320 | 4/1988 | Bristol | 364/300 |
| 4,823,254 | 4/1989 | Takada et al. | 364/188 |

*Primary Examiner*—Jerry Smith
*Assistant Examiner*—Paul Gordon

*Attorney, Agent, or Firm*—Lowe, Price, LeBlanc, Becker & Shur

[57] ABSTRACT

A loop control apparatus for controlling general process control such as control of the temperature of water supply comprises an interpreter for interpreting input information in the form of trains of characters to provide instrument information and a compiler for interpreting the train of character and compiling therefrom operational equation information. The trains of characters are inputted from an external general purpose computer as a man-machine interface through a serial interface provided within the loop control apparatus, and are subjected to word analysis and syntax analysis by the interpreter and the compiler. Loop control function information produced through the word and syntax analysis is stored into a memory means. Once the instrument design and the operational design have been completed, the interface computer is not needed and can thus be used for other jobs not related to the system under control. When controlling the system, a control means processes the process values of the system in accordance with the loop control function information to provide manipulate values to thereby perform the loop control of said system.

5 Claims, 11 Drawing Sheets

LOOP CONTROL APPARATUS

BACKGROUND OF THE INVENTION

1. Field of the Invention

The present invention relates to a loop control apparatus for general process control such as flow rate control, pressure control, temperature control of fluid including water and air, and more particularly to a loop control apparatus provided with a function for designing loop control functions.

2. Description of Prior Art

Conventionally, both instrument design and operational equation design are necessary to enable a loop control apparatus to have a wide variety of functions of loop control. The instrument design represents defining and registering various parameters with respect to meters or instruments as elements for the control, and includes: setting values of filter elements; setting MIN and MAX values of physical or engineering quantity that correspond to the range of analog inputs; assigning output port numbers to the analog inputs/outputs; setting PID parameters for PID control such as PB (proportional band), TI (integrated time), TD (derivative time); specifying names of the meters and setting units of the engineering quantity. The setting MIN and MAX values of the engineering quantity is referred to a procedure in which, for example, for an analog input of voltages of 1–5 volts representing temperatures of 0–100 degrees Celsius, 1 V is assigned 0 degrees and 5 V is assigned 100 degrees. The purpose of assigning the port numbers for the analog inputs/outputs is to assign a specific hardware port number to each analog quantity. The operational equation design represents defining specific operations or tasks of the respective instruments, and includes: reading an analog input and translating it into an engineering quantity by means of an A/D converter; determining target values; calculating a manipulate value MV through PID algorithm on the basis of SV, PV, PID parameters; and converting the manipulate value MV into an analog quantity and outputting to the loop under control.

SV is a target value or set value to which the loop system is to be controlled, PV is a process value i.e., actually measured or obtained value through external sensors etc., MV is a manipulate value by which the physical quantity of the loop system is to be increased or decreased with respect to the set value SV. PB, TI, TD are called proportional band, integrated time, and derivative time, respectively, and are used in operation for PID or I-PD.

Conventionally, two methods of loop control apparatus having the described design functions have been used. A first method is a type in which a single computer performs a man-machine interface for designing the loop control functions as for well as execution of control procedures. Displaying and checking data inputs in the interface mode, an operator can perform the instrument design and the operational equation design. A CRT and a Key board used for monitoring purpose in the man-machine interface mode are idle during the control mode of the loop, thus being uneconomical.

A second method is a type in which the man-machine interface is performed by one computer and the control of the loop is effected by another. The instrument design and operational equation design are effected through the "interface computer" which checks design data and communicates the various design data with the "control computer".

With the stated prior art loop control apparatus, producing trains of characters for designing a loop control function requires an application software for formatting the characters. One major problem which has been encountered in connection with the prior art application software method is that determining of PV, SV, and MV or specifying the input/output operation is performed through "fill-in-the-blank", which requires a graphical picture such as an input field in the form of a box or frame into which the user fills the respective parameters. A plurality of such graphical pictures are required for many systems to be controlled except a simple loop where determination of PV, SV, MV or input/output operation will not vary during the loop control. The software for this purpose is different from model to model unless the models are of the same series of the same supplier.

SUMMARY OF THE INVENTION

An object of the invention is to provide a loop control apparatus in which, when producing the loop control function information, design of the loop control can be performed using the screen editor of a general purpose computer as an interface computer and by using the interpreter and the compiler of the control computer instead of a specific software.

Another object of the present invention is to provide a loop control apparatus equipped with an instrument design interpreter which can be communicated through a general purpose, inexpensive computer readily available in the market.

With a loop control apparatus according to the present invention, an operator inputs a train of characters written in a predetermined grammar as control function information through a man-machine interface. This control function information includes information on instruments and information on operational equations. An analysis means or interpreter receives the train of characters through the standard serial interface and then performs words and phrases analysis and syntax analysis to produce the loop control function information. The loop control function information is stored in a memory means. In this manner, both the instrument design and the operational equation design are carried out.

Figure 1:
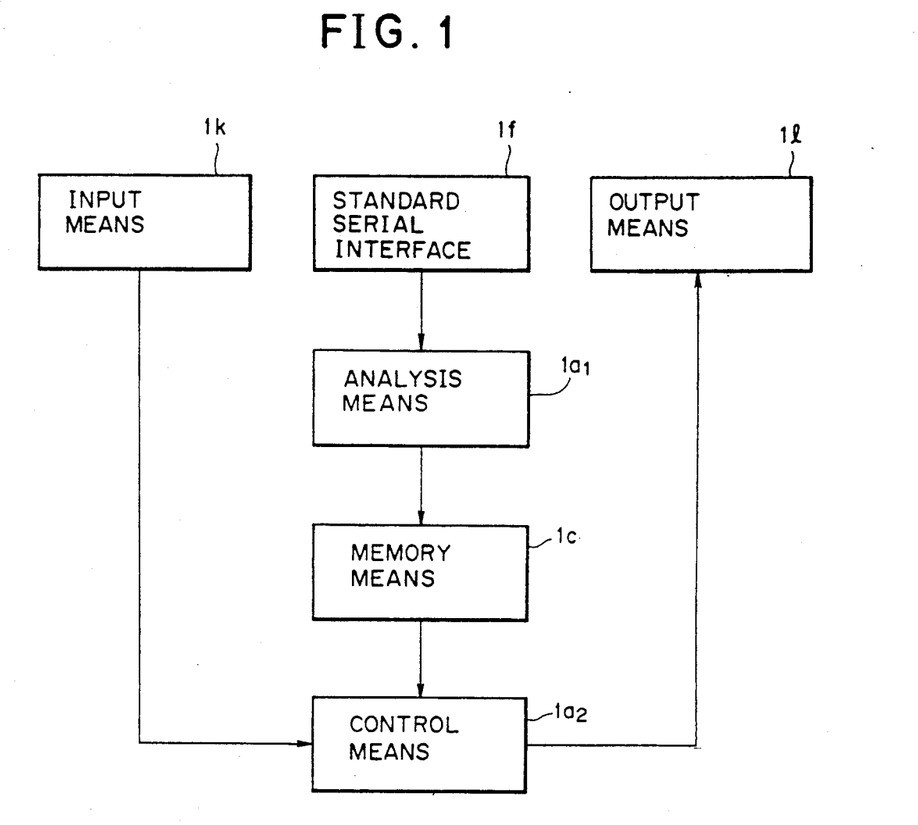
FIG. 1 is a block diagram for showing a basic arrangement of a loop control apparatus according to the present invention.

When controlling the loop, a control means $1a2$ provides a manipulate value MV through an output means $1l$ on the basis of the control function information and a detected quantity or process value PV which is read through an input means $1k$.

When the instrument design and/or the operational equation design are completed, the interface computer becomes idle and can be used for other jobs not particularly related to the control. The man-machine interface can be anything, for example, a personal computer as far as it has a function of editing the train of characters and a function of communicating with a standard serial interface in a loop control apparatus according to the present invention.

BRIEF DESCRIPTION OF THE DRAWINGS

Features and details of the invention will be apparent from description of specific embodiments with reference to the accompanying drawings in which.

DESCRIPTION OF PREFERRED EMBODIMENTS

Operation

A sample control using a loop control apparatus according to the present invention will now be described with reference to FIG. 11 and FIG. 12.

Figure 11:
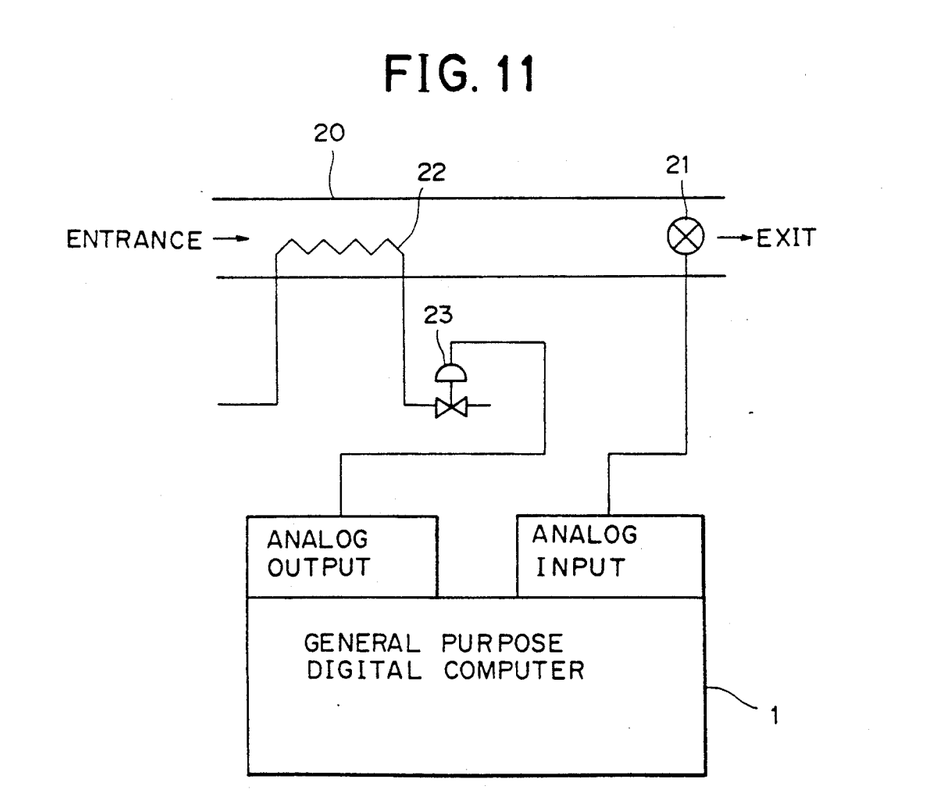
FIG. 11 and FIG. 12 illustrative diagrams for showing sample loop controls using the apparatus according to the invention.

FIG. 11 shows a control in which water of temperatures ranging from 0-30 degrees Celsius entering an entrance of a pipe 20 is heated to a constant temperature or set value SV of 35 degrees Celsius and is output through an exit. Within the pipe 20 is provided a temperature sensor 21 for detecting the temperature or process value PV of the warm water exiting the pipe 20 and a heating means 22. The heating means 22 is formed of steam pipes in which a diaphragm 23 is provided for adjusting the amount of steam.

The temperature sensor 21 and the diaphragm 23 are connected to an analog input port and an analog output port, respectively, of a digital computer 1. The digital computer 1 (1) converts an analog input signal or process value PV transmitted from the temperature sensor 21 into a digital signal; (2) converts this digital signal into an engineering quantity i.e., temperature in degrees Celsius; (3) then calculates the valve opening of the diaphragm 23 as a manipulate value MV thereof through algorithm of PID etc. on the basis of the target or set value (SV) of 35 degrees Celsius and the process value (PV); (4) the manipulate value MV is then further processed so that the MV is converted into a digital signal having the same resolution as the valve opening of the diaphragm 23; and (5) the digital signal after scaling is then converted into an analog signal and is output to the diaphragm 23 through the analog output port. The valve opening of the diaphragm 23 is adjusted by this analog signal.

Calculation of the process value PV and manipulate value MV requires parameters such as MAX and MIN of the scale of the temperature sensor 21, proportional band PB, integrated time TI, derivative time TD, and direction of control (e.g. increase or decrease the value of MV with respect to the difference between SV and PV). The MIN and MAX of the scale of the temperature sensor 21 are used for converting the input analog quantity into a digital signal having a proper digital representation of maximum and minimum values, e.g., for an analog input of voltages of 1-5 volts representative of temperatures of 0-100 degrees Celsius, 1 V is assigned 0 degrees and 5 V is assigned 100 degrees. The aforementioned (1) and (2) are carried out by an incorporated ADC (analog to digital conversion) subroutine (3) by PID subroutine, and (4) and (5) by DAC (digital to analog conversion) subroutine, respectively. Following train of characters are provided for this purpose.

TEC-MIN=0; minimum value of 0 degrees
TEC-MAX=100; maximum value of 100 degrees
PB=70; proportional band 70%
TI=5; integrated time of 5 sec
TD=1; derivative time of 1 sec
DIREC=0; control direction is reverse The trains of characters are analyzed by an instrument design interpreter and are then stored as the parameters into the instrument information area of the memory.

In the mean time, SV=35, ADC, PID, DAC are provided through the man-machine interface in the operation equation design as follows.

SV=35;
ADC;
PID;
DAC;

Trains of characters for the operational equation design are analyzed by an operational equation compiler into machine language and are then stored in the form of machine language into an operational equation machine language area of the memory.

Figure 12:
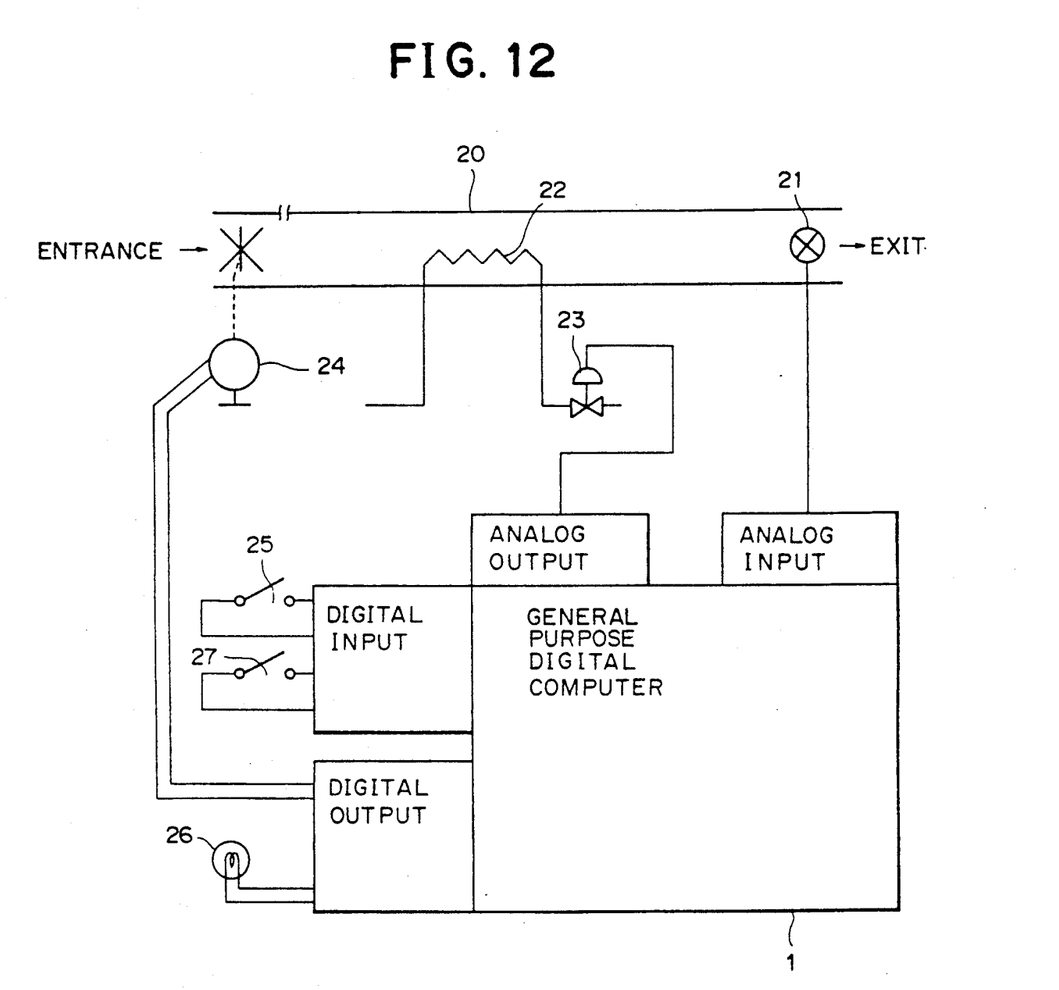

FIG. 12 shows an example in which a digital input port and a digital output port are added to the loop control system shown in FIG. 11 thus the loop control system including sequence control. A motor 24 starts to operate when a start switch 25 of the motor 24 is pressed, then a lamp 26 indicative of "water temperature is under control" lights up after ten seconds, and the diaphragm 23 is adjusted its opening for a temperature of 35 degrees Celsius of the water exiting the exit. The motor 24 stops when a stop switch 27 is operated, the diaphragm 23 is fully closed after five seconds, and then the water-temperature control lamp lights out.

The instrument design in this case is similar to that in FIG. 11 and detailed description is omitted.

Following train of characters are provided in the operational equation design.

SV=35; set the target temp. to 35 degrees
ADC; A/D conversion of current temp.
IF (DO001==1) if "water temp. under cont." lamp is ON . . .
{
    PID; calculate MV through PID algorithm
    DAC; D/A conversion
}
ELSE if "water temp. under cont." lamp is not ON . . .
{
    MV=0; set MV to 0
    DAC; D/A conversion
}

These trains of characters are converted into machine language by the operational equation compiler.

The operational equation design for this operation includes A/D conversion, decrementing the timer count of a five-second timer after operation of the motor stop switch, setting internal relays (flags) to off after the timer has counted up, setting a five-second timer after the motor stop switch is operated during the water-temperature control, setting internal relays to off after the motor stop switch is pressed, incrementing the timer count of a ten-second start timer for operating the motor 24 during ON period of internal relay (flags), stopping the motor 24 after the start timer is fully counted up. PID operation or calculation after the start timer is fully counted up, setting the target or set value SV (35 degrees Celsius), D/A conversion and recognition of time-up of the timers, lighting up the lamp 26 during counting operation of the start timer or when no switches are operated, and calculation of the target value or set value and D/A conversion of the MV. Inputting/outputting digital signals is timed through the operation equation design.

EMBODIMENTS

Embodiments of the present invention will now be described in detail with reference to FIG. 2.

Figure 2:
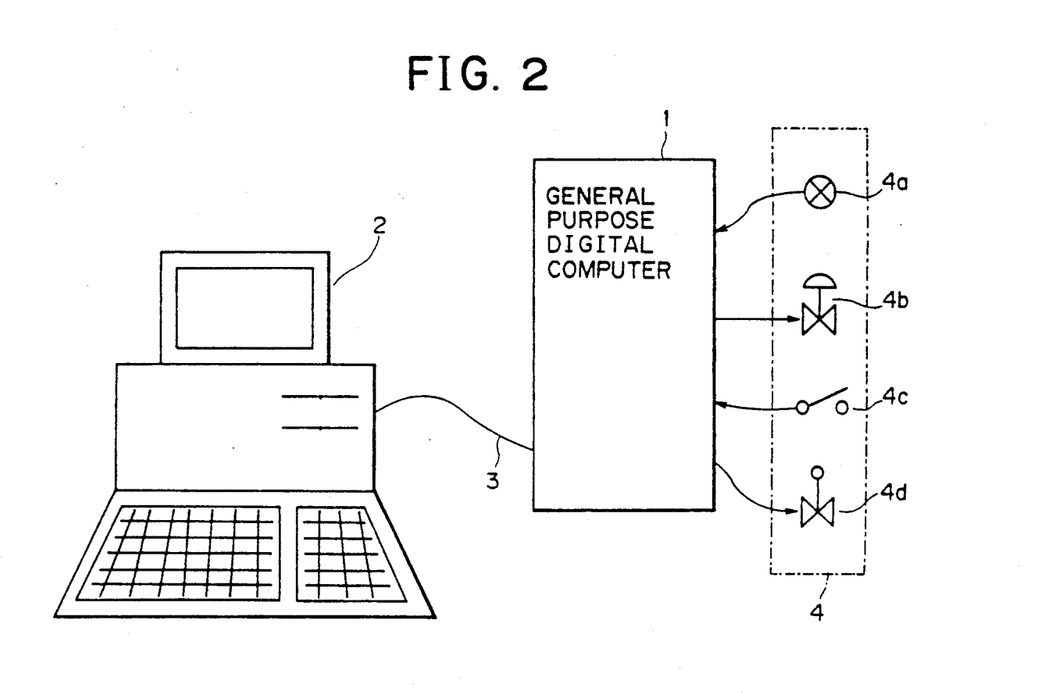
FIG. 2 is a perspective view of a system employing the apparatus according to the invention.

FIG. 2 is a perspective view of a control system in which a loop control apparatus according to the invention is incorporated. In FIG. 2, a general purpose digital computer 1 has a loop control function and communication function etc. and operates as a loop control apparatus according to the invention. A general purpose digital computer 2 has an edit function (screen editor etc.) and a communication function, and is provided with interface means such as a CRT, a key board and a mouse. The digital computers 1 and 2 are connected to each other through a RS-232C signal line 3 as a standard serial interface and communicate with each other through the signal line 3. A process 4, which is controlled by the control apparatus, is provided with an analog-signal generator 4a such as a sensor, an analog-signal operated device 4b such as a manipulator, a digital signal generator 4c such as a switch, and a digital-signal operated device 4d such as a magnetic valve. The digital computer 1 processes signals from the analog signal generator 4a and the digital signal generator 4c so as to output signals to the analog-signal operated device 4b and the digital-signal operated device 4d, respectively.

Figure 3:
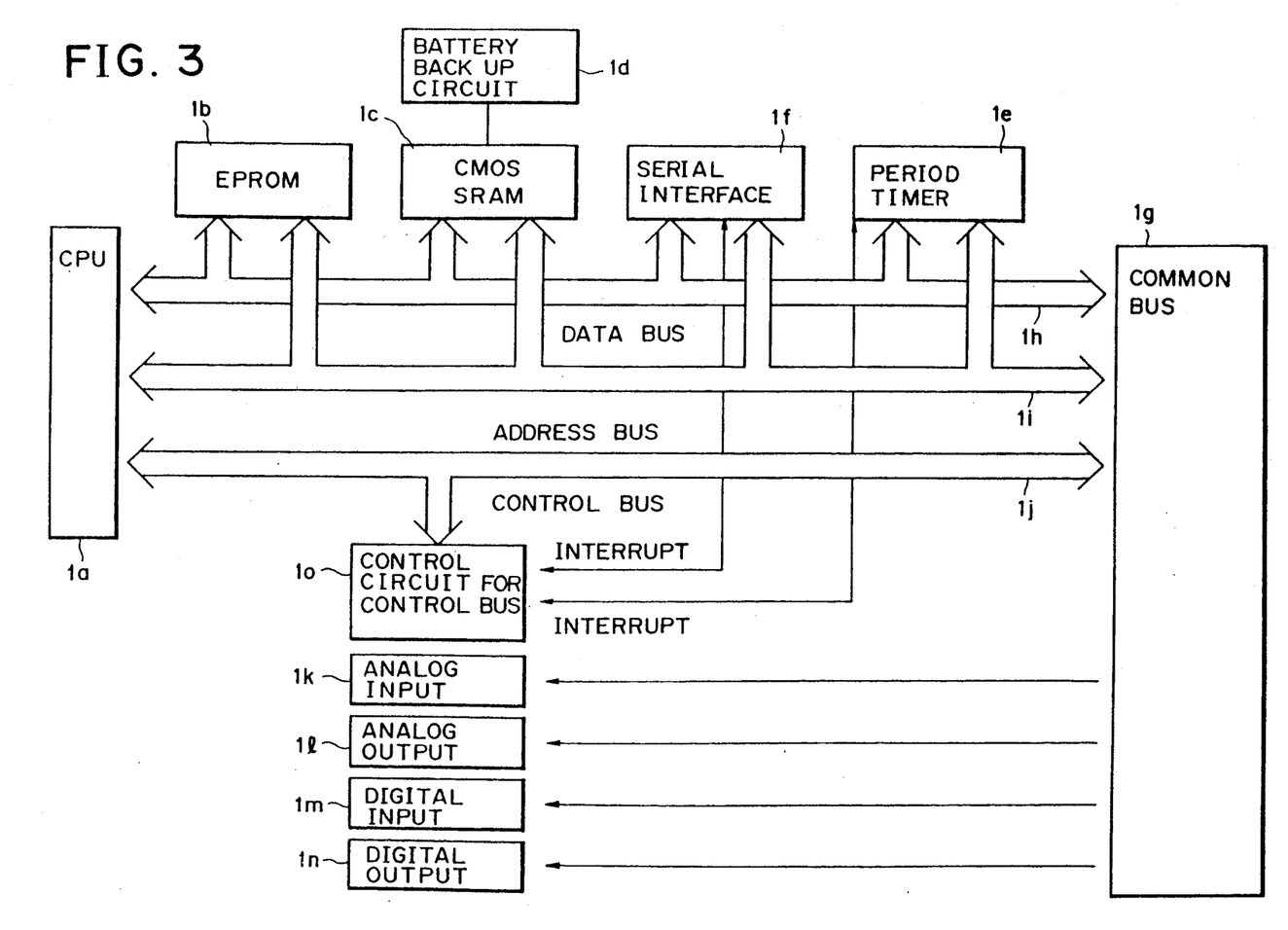
FIG. 3 is a block diagram for illustrating a specific example of an apparatus according to the invention.

FIG. 3 is a block diagram for illustrating the hardware of the general purpose digital computer 1 shown in FIG. 2. A CPU 1a operates in accordance with a predetermined control program and performs later described various jobs. Within an EPROM 1b are stored an instrument design interpreter, an operational equation compiler, built-in subroutines as well as the control program. Within a CMOS-SRAM 1c are stored operational equation machine language and instrument information.

A battery back-up circuit 1d prevents the instrument information and the operational equation information stored in the CMOS-SRAM from being lost due to power failure.

A period timer produces timings required for on-line operation. The on-line operation is referred to as a state of the apparatus in which control operation of the process system is being carried out. A serial interface 1f performs serial interface through the RS-232C signal line with the general purpose digital computer 2 operating as a man-machine interface located outside this control computer. A common bus 1g consists of a data bus 1h, an address bus 1i, and a control bus 1j and functions to transmit and receive signals between input/output boards 1k to 1n. A control-bus control circuit 1o performs control for sending read/write instructions and sync. signals such as interrupt, halt, and acknowledge.

The digital computer 1 thus far described is an intelligent type controller equipped with analog input/output ports and digital input/output ports and having a loop control function, a design function, and a communication function. Particularly, the design function is implemented by providing the instrument design interpreter, the operational equation compiler, and general purpose built-in subroutines. The digital computer 1 can communicate with the external general purpose computer having the same interface (i.e., RS-232C). A compiler method employed permits a high speed control operation of a process.

The instrument design interpreter, the operational equation compiler and the general purpose subroutines stored in the EPROM 1b will now be described as follows.

The instrument interpreter starts to operate upon arrival of a train of characters having a header indicative of an instrument design data through the serial interface 1f. The interpreter interprets the train of characters and then writes the design data into a predetermined area in the CMOS-SRAM. The train of characters from the interface computer must, of course, be written in a predetermined grammar. If there is any error in the train of characters, then the interpreter answers back the row number and category of error extracted on the basis of a return code within that train of characters in question. The instrument design in this case includes instrument labels, analog input/output ports, maximum and minimum values of sensor span, PID constants, types of instruments, control direction, filter time constants, decimal points, and units.

The operational equation compiler starts to operate upon arrival of a train of characters having a header indicative of operational equation data through the serial interface 1f. The computer interprets the train of characters and then writes the design data, in machine language which can be directly executed by a CPU, into a predetermined area in the CMOS-SRAM. Again, the train of characters sent from the interface computer must be written in a predetermined grammar. If there is any error in the train of characters, then the compiler answers back the row number and category of error extracted on the basis of a return code within that train of characters in question. The operational equations in this case include equations in which loop control logic such as A/D conversion, calculation of SV, calculation of PID are stated.

The general purpose built-in subroutines are provided in the form of a subroutine in which input/output instructions and control logic can be readily stated, thus enabling the operator to carry out the design work by simply calling these subroutines in a predetermined format without knowledge of the logic of PID. The subroutines include A/D conversion, D/A conversion, PID operation, cascade connection, kinked graph approximation, and filter calculation.

The CMOS-SRAM 1c has various areas such as a command buffer area, a system supervision area, a machine language area for the operational equations, an instrument information area, a digital inputs or D/I information area, a digital outputs or D/O information area and an internal relay information area.

The command buffer area is an area for storing codes sent from the interface computer through the serial interface 1f. The system supervision area is an area for storing the information on entire operation of the apparatus. Within the system supervision area are stored ON-LINE/OFF-LINE flag indicative of whether the control apparatus is on line or off line; an instrument design completion flag indicative of whether or not the instrument information for on-line operation has been properly defined, which flag indicates ON if the instrument design has been completed normally and OFF if the instrument design has not been done or has been terminated with some abnormality; operation equation design completion flag representative of whether or not the machine language of the operational equations to be executed with a predetermined cycle are normally produced, which flag indicating ON if the machine language is normally produced and OFF if not.

The operation equation machine language area is an area for storing machine language so that the operational equations stating the loop control can be executed at as a fast speed as possible. The machine language is produced through the operation equation design and is read when the respective operational equation is executed.

The instrument information area is for storing information on instruments as a basic element for monitoring and performing control. Within the instrument information area are stored instrument labels, SV, PV, MV, PB, PI, TD, decimal points, MAX and MIN of sensor span, display span MAX and MIN, control directions, filter constants, units, analog input/output channels. The instrument labels stored in the instrument information area are for identifying the loop number used within the control apparatus. The labels are assigned to the respective instruments by the users for convenience since naming the respective instruments by numbers is not easy to work with. SV is a target value or set value for controlling the loop system, PV is a measured value or process value obtained through external sensors etc., and MV is a manipulate value for controlling the loop system. PB, TI, TD are called proportional band, integrated time, and derivative time, respectively, and are used in calculation for PID or I-PD.

The sensor span MAX and MIN represent MAX and MIN of the engineering values corresponding to the full scales of the sensors, and the display span MAX and MIN indicate MAX and MIN values of the full scales when monitoring the system under control externally of the control apparatus.

The position of decimal point is not directly related to the control of the system. If specifies position of the decimal point when displaying a numerical value outside of the control apparatus. The unit, though not directly related to the control of the system, is for displaying the unit of the engineering values indicated by the instrument. The control direction is for specifying increase or decrease of the manipulate value MV in accordance with the difference between SV and PV. The filter constants are time constant of a first order lagging filter that is inserted for retarding disturbance from outside when receiving the analog inputs.

D/I information area is an area for storing ON/OFF information of the digital inputs such as signals from external switches. The digital ON/OFF information is copied from the digital input ports before execution of the respective operational equations and is then read into the CPU 1a when executing the operational equations.

D/O information area is an area for storing ON/OFF information on the digital outputs. The digital information is written into or read out of the area when executing the respective operational equations, and is then transferred to the digital output ports from the area.

Internal relay information area is an area for storing ON/OFF information on the relays (flags) incorporated within the control apparatus and used for a sequencer. The internal relay information is written into or read from the area when executing the respective operational equations.

The instrument design and the operational equation design are effected when the control apparatus is off line i.e., the control apparatus is not controlling the loop system.

Figure 4:
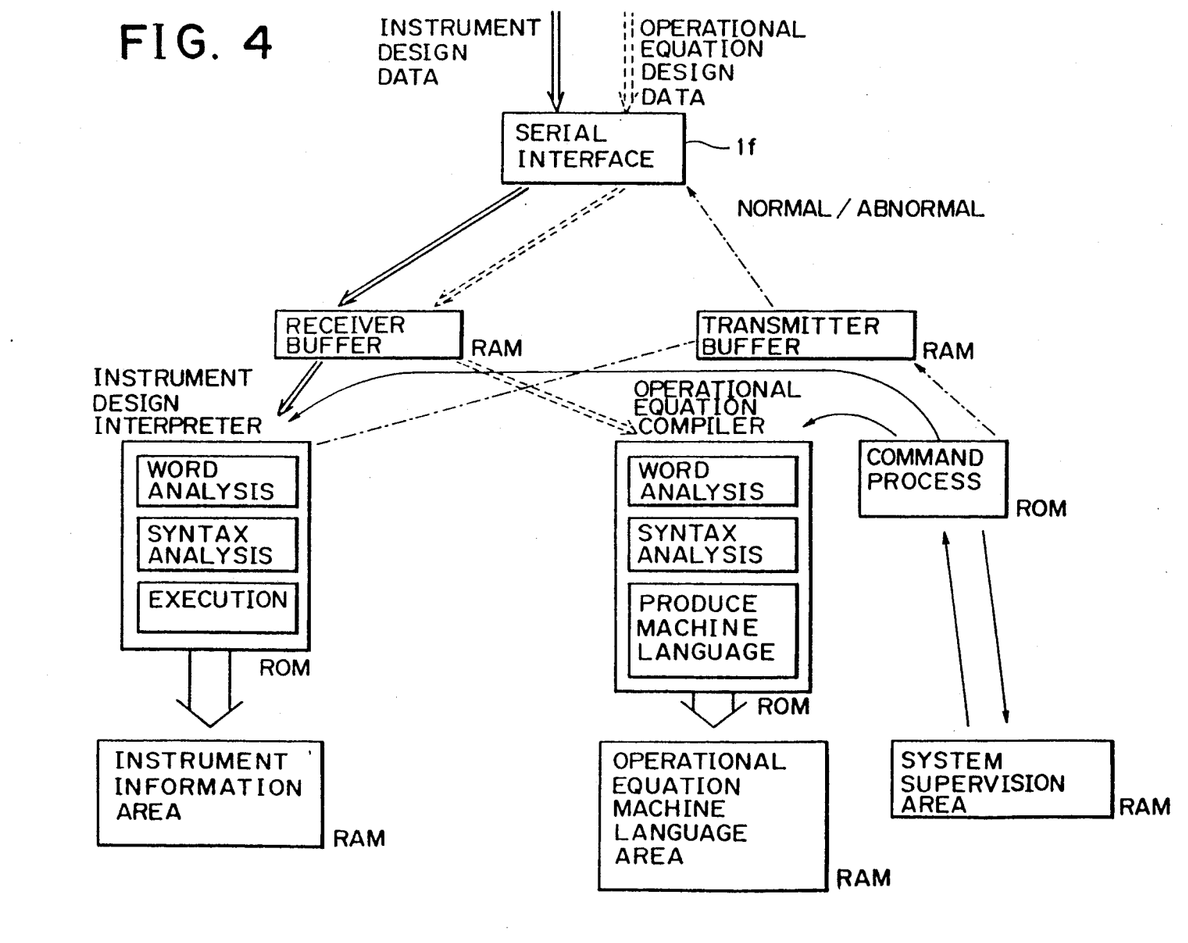
FIG. 4 is an illustrative diagram for showing flow of data in the apparatus in FIG. 3.

The data of the respective design is processed as shown in FIG. 4.

The instrument design data and the operational equation design data are input from outside of the control apparatus through the RS-232C signal line 3 and the serial interface 1f, and are stored into a receiver buffer in the RAM 1c. The data in the receiver buffer is branched to an appropriate processing by a command processing program. The command processing decides whether the data is for design, start/stop, data request, or data setting.

If the command is for design, the ON-LINE/OFF-LINE flag in the system supervision area is read. If the flag indicates ON-LINE, then an error information indicating that the design is not allowed is transmitted to the outside through a transmitter buffer in the RAM 1c, the serial interface 1f, and the RS-232C signal line 3. If the flag indicates OFF-LINE, then the data in the receiver buffer is branched either to the instrument design or operation equation design depending on the command.

If the command is for the instrument design, the instrument design interpreter is actuated for performing word analysis and syntax analysis to write data into the instrument information area in the RAM 1c. If the design completes normally, then the normal completion code is transmitted to the outside while also setting the instrument design completion flag in the system supervision area to ON. If the design is terminated abnormally, the row number determined on the basis of the abnormality category code and the return code in the train of the characters is transmitted to the outside while also setting the flag to OFF.

If the command is for the operational equation design, the operational equation compiler is actuated for performing word analysis and syntax analysis to produce the corresponding machine language, and then the machine language is written into the operational equation machine language area of the RAM 1c. If the design is completed normally, then the normal completion code is transmitted to the outside while also setting the operational equation design flag in the system supervision area in the RAM 1c to ON. If the design is terminated abnormally, the row number determined on the basis of the abnormality category code and the return code in the train of characters is transmitted to the outside while also setting the flag to OFF.

If the command is for the start, the instrument design completion flag in the system supervision area and the operational design completion flag are read. If all the flags are ON, then the ON-LINE/OFF-LINE flag in the system supervision are is interrogated. If the flag indicates OFF-LINE, the flag is set to ON-LINE and the normal completion code is transmitted to the outside. If the flag indicates ON-LINE then an error information indicating that ON-LINE is intended twice is transmitted to the outside.

If the command is for stopping, the ON-LINE/OFF-LINE flag in the system supervision area is interrogated. If the flag indicates ON-LINE, then it is set to OFF-LINE and the normal completion code is outputted to the outside. If the flag indicates OFF-LINE then an error information indicating that OFF-LINE is intended twice is transmitted to the outside.

If the command is data-request for requesting that the internal information (control information, status etc.) of the control apparatus is outputted to the outside, the requested data is read from the instrument information area on the basis of the category of the data and the instrument number are obtained and is then transmitted to the outside. If the data is erroneous then a signal indicative of the error is transmitted. The data category includes SV, PV, MV, PB, TI, TD, user labels, decimal point position, sensor span MAX/MIN, display span MAX/MIN, unit, and control mode.

If the command is data setting for rewriting from outside the internal information of the control apparatus, the category of data, the instrument number, and data to be set are obtained from the command. If the data is in error, then an error signal indicating that the data is in error is transmitted to the outside. If the data is normal, then the data is written into a predetermined area of the instrument information area and the normal completion code is outputted. The data category includes PB, TI, TD, and control mode.

In addition, the loop control is effected through interrupt with a predetermined time period by the period timer $1e$.

The operation of the loop control apparatus thus far described will be described in detail with reference to flowcharts in FIG. 5 to FIG. 10, which illustrate jobs performed by the CPU $1a$ in accordance with the predetermined program.

Figure 5:
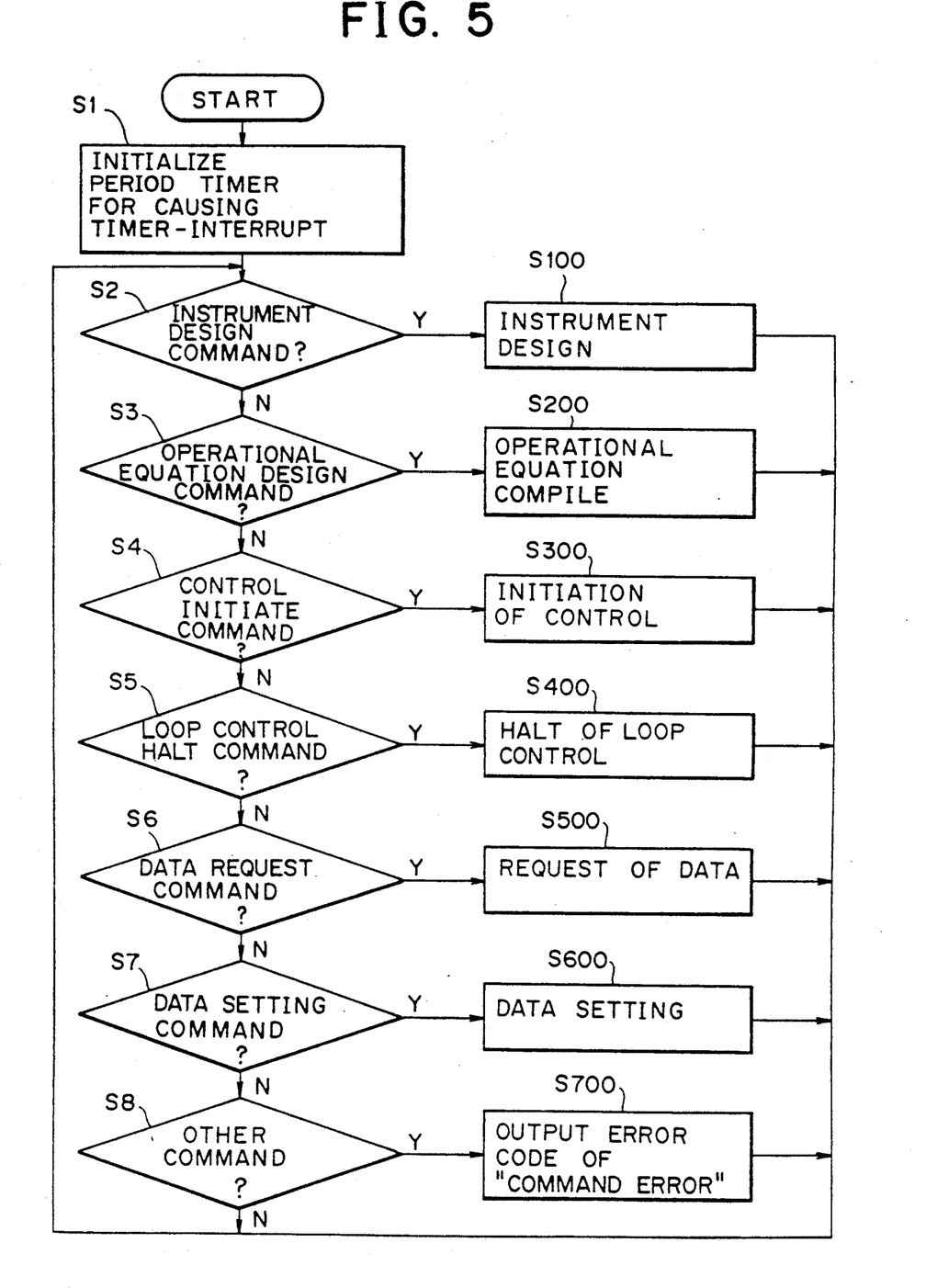
FIG. 5 to FIG. 10 are flowcharts for illustrating the procedure which is carried out by a CPU in FIG. 3.

The CPU $1a$ starts to operate upon turn-on of the power supply of the apparatus. At step 1, the CPU initializes the period timer $1e$ for generating timerinterrupt. Then at steps 2 to 8, decisions are made based on whether the instrument design command, the control initiation command, the control termination command, the data request command, or the data setting command is present. The steps 2–8 are carried out repeatedly until any one of these commands is detected.

If the decision at step 2 is YES i.e., the instrument design command is present, the CPU proceeds to the instrument design subroutine at step 100; if the decision is YES at step 3, the CPU proceeds to the operation equation design subroutine. The other decisions proceed similarly: if YES at step 4, the CPU proceeds to the control initiation subroutine at step 300; if YES at step 5, the CPU proceeds to the control termination subroutine at step S400; if YES at step 6, the CPU proceeds to the data request subroutine at step 500; and if YES at step 7, the CPU proceeds to the data setting subroutine at step 600. If the decision is YES at step 8, then the CPU proceeds to step 700 to transmit to the outside an error code indicating that the command is in error through the serial interface $1f$.

Figure 6:
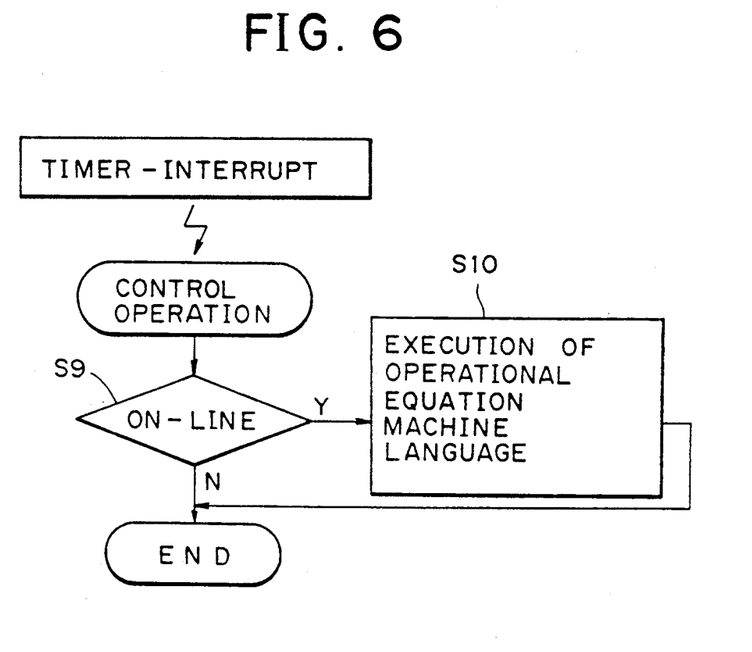

If interrupt occurs while the steps described above are being executed, then the execution of the flowchart in FIG. 5 is halted and the flowchart in FIG. 6 for control operation is carried out. In the flowchart, a decision is made at step 9 based on whether or not the control apparatus is ON-LINE by interrogating the ON-LINE/OFF-LINE flag in the system supervision area of the RAM $1c$. If the decision is NO, then execution of the flowchart in FIG. 6 is terminated and the steps in the flowchart in FIG. 5 are again carried out, resuming from a step at which the execution of the flowchart was previously interrupted. If the decision is YES at step 9, then at step 10 the control operation represented by the operational equation machine language is carried out and then the execution of the flowchart in FIG. 5 is resumed from a step at which the execution was interrupted.

Additionally, all the information in the RAM $1c$ is held since the RAM $1c$ is backed up. Thus even if the power supply is switched off, the control operation is immediately resumed without having to perform the instrument design interpretation and operational equation compilation.

Figure 7:
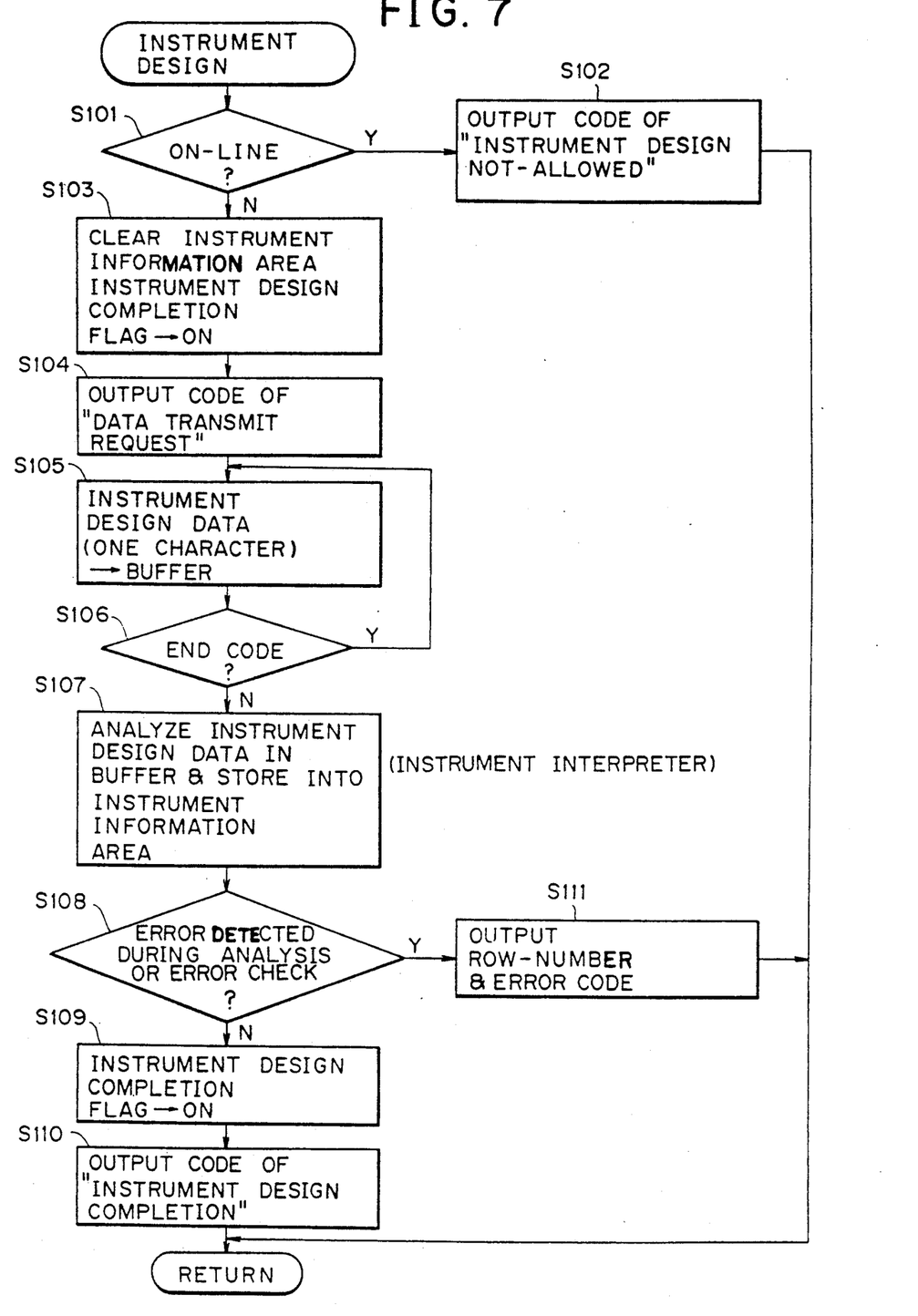

In the instrument design subroutine shown in FIG. 7, at step 101, a decision is made based on whether or not the control apparatus is ON-LINE by interrogating the ON-LINE/OFF-LINE flag in the system supervision area of the RAM $1c$. If the decision is YES, then the CPU proceeds to step 102 and outputs to the outside through the serial interface $1f$ a code indicating that the instrument design cannot be carried out, and returns to step 2 of the flowchart in FIG. 5.

On the other hand, if the decision at the step 101 is NO, then the CPU proceeds to step 103 to clear the instrument information area in the RAM $1c$ for receiving a new instrument information while also setting the instrument design completion flag in the system supervision area to OFF. Thereafter the CPU proceeds to step 104 to output to the outside through the serial interface $1f$ a transmit request code for requesting of transmission of the instrument design data. Then the CPU proceeds to step 105 to store into the receiver buffer in the RAM $1c$ one character of the instrument design data which is input from the outside through the serial interface $1f$. At step 106, a decision is made based on whether or not the one character stored into the receiver buffer in the RAM $1c$ at step 105 is an end code i.e., the transmission is completed. If the decision is NO, then the CPU returns to step 105. Thereafter steps 105 and 106 are repeated till the decision at step 106 is YES, and when the decision becomes YES, the CPU proceeds to step 107.

At step 107, the instrument design data in the buffer is analyzed and is stored in the instrument information area in the RAM $1c$. That is, step 7 carries out a job as the instrument design interpreter. Then the CPU proceeds to step 108 to make a decision based on whether or not an error is detected through the analysis or error check at step 107. If the decision at step 108 is NO, then the CPU proceeds to step 109 to output the instrument design completion code to the outside through the serial interface $1f$ and returns to step 2 in FIG. 5. If the decision is YES at step 108, the CPU proceeds to step 111 to output to the outside through the serial interface $1f$ an error code and the row number of the row at which error is detected, and then returns to step 2 in FIG. 5.

Figure 8:
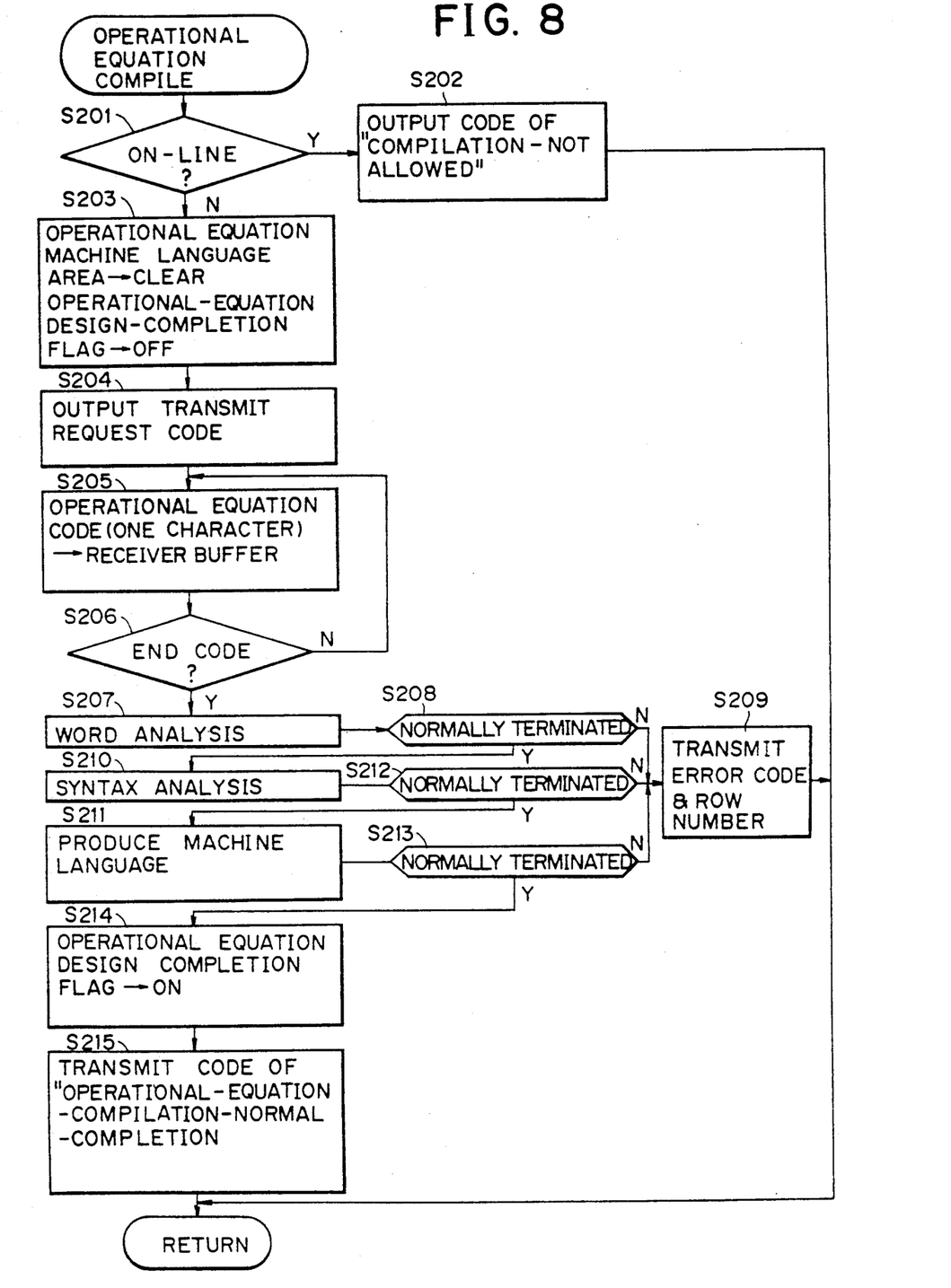

In the operational equation compile subroutine, at step 201, as shown in FIG. 8, a decision is made based on whether or not the control apparatus is ON-LINE by interrogating the ON-LINE/OFF-LINE flag in the system supervision in the RAM $1c$. If the decision is YES at step 201, then the CPU proceeds to step 202 to output to the outside through the serial interface $1f$ a code indicating that compilation for the operational equation design cannot be carried out, and then returns to step 2 of the flowchart in FIG. 5.

On the other hand if the decision at step 201 is NO, then the CPU proceeds to step 203 for clearing the operational equation machine language area in the RAM $1c$ to receive a new operational equation machine language while also setting the operational equation design completion flag in the system supervision area to OFF. Thereafter the CPU proceeds to step 204 to output to the outside through the serial interface 1f a transmission request code requesting of transmission of the operational equation design data. Then the CPU proceeds to step 205 to store into the receiver buffer of the RAM 1c one character of the operational equation design data which is input from outside through the serial interface 1f. At step 206, a decision is made based on whether the one character stored into the receiver buffer at step 205 is the end code or not. If the decision is NO, the CPU returns to step 205 regarding that the transmission is not completed, and stores next one character into the receiver buffer. Thereafter, steps 205, and 206 are repeated till the decision at step 206 is YES, and then the CPU proceeds to step 207 when the decision becomes YES.

At step 207, word analysis in the operational equation design data is carried out and a decision is made based on whether or not the analysis has been completed normally at step 208. If the decision at step 208 is NO, then the CPU proceeds to step 209, while if the decision is YES the CPU proceeds to step 210. At step 209, an error code and the row number of a row at which the error is detected are output through the serial interface 1f. At step 210, syntax analysis is carried out. At step 211, a decision is made based on whether or not the syntax analysis has been normally completed. If the decision at step 211 is NO, then the CPU proceeds to step 209, while if the decision is YES then the CPU proceeds to step 212. At step 212, the machine language is produced and is stored into the operational equation machine language area in the RAM 1c. A decision is made at step 213 based on whether or not the production of the machine language has been normally completed. If the decision at step 213 is NO, then the CPU proceeds to step 209; while if the decision is YES the CPU proceeds to step 214. At step 214, the operational equation design completion flag in the system supervision area is set to ON. At step 215, an operational equation compile normal completion code is transmitted to the outside through the serial interface 1f and then the CPU returns to step 2 of the flowchart in FIG. 5.

Figure 9:
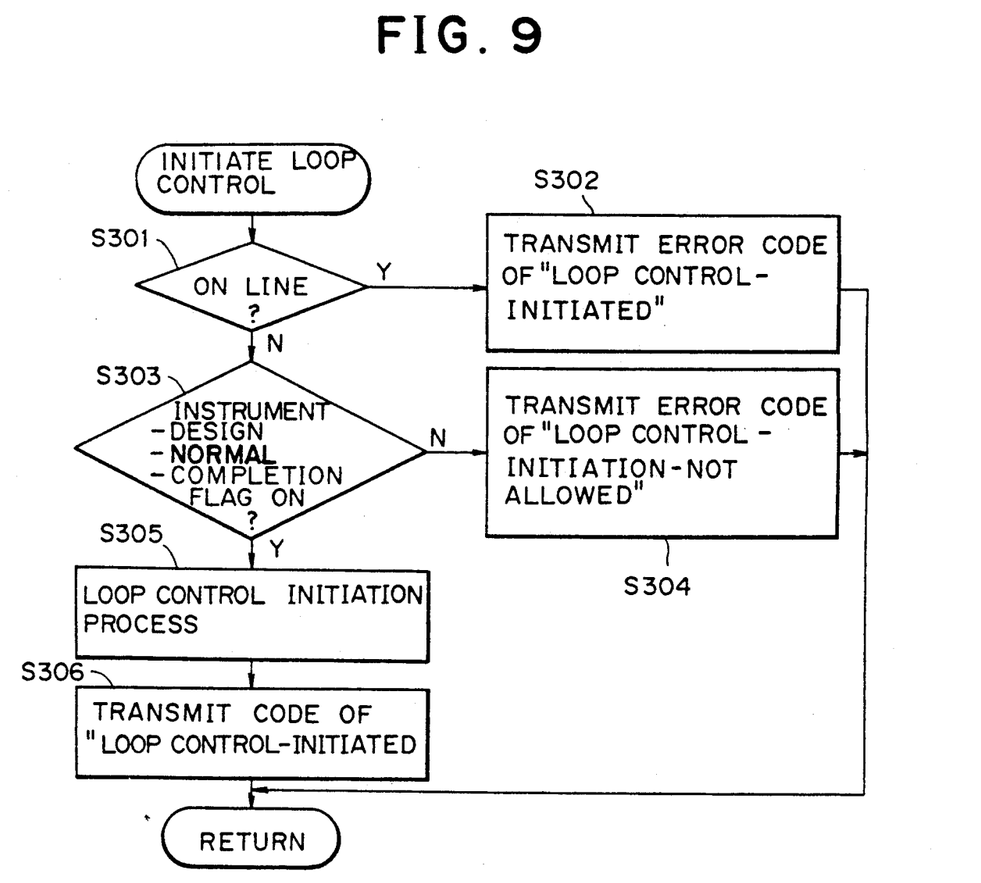

In the control initiation subroutine, as shown in FIG. 9, at step 301, the ON-LINE/OFF-LINE flag in the system supervision area of the RAM 1c is interrogated to decide whether or not the control apparatus is ON-LINE. If the decision at step 301 is YES, the CPU proceeds to step 302 to transmit an error code indicative of completion of the control initiation, and then returns to step 2 in FIG. 5. If the decision at step 301 is NO, the CPU proceeds to step 303 to make a decision based on whether or not the normal completion flag of the instrument design and the operational equation design are ON. If the decision at step 303 is NO, the CPU proceeds to step 304 to transmit to the outside an error code indicating that initiation of the control is unable and returns to step 2. If the decision is YES at step 303, the CPU proceeds to step 305 to carry out control initiation processing. Then at step 306 a code indicating that the control has been initiated is transmitted to the outside and then returns to step 2 in FIG. 5.

Figure 10:
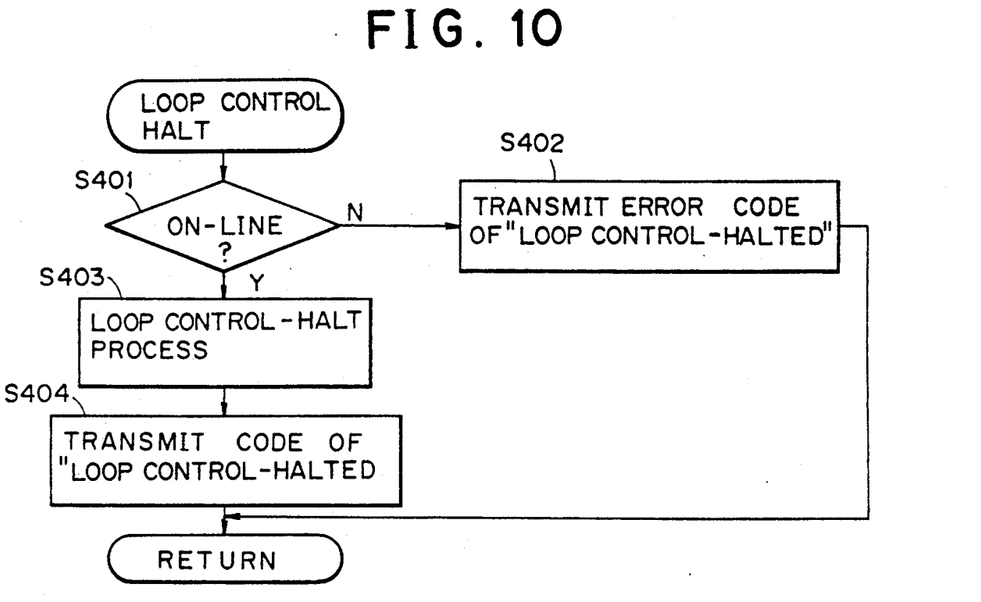

In the control termination subroutine, as shown in FIG. 10, a decision is made based on whether or not the control apparatus is on-line. If the decision at step 401 is NO, the CPU proceeds to step 402 to transmit an error code indicating that termination of control has been accomplished, and then returns to step 2 of the flowchart in FIG. 5. If the decision at step 401 is YES the CPU proceeds to step 403 to carry out the control termination processing. Thereafter the CPU proceeds to step 404 to transmit to the outside a code indicating that the loop control is halted, and then returns to step 2 in FIG. 5.

In the data request subroutine at step 500, the CPU transmits the instrument data corresponding to the data request command when the data for the control is requested by devices outside of the control apparatus. In the data setting subroutine at step 600, when alteration of the data used for the control is instructed externally, the CPU receives the instrument data corresponding to the respective setting commands and stores the instrument data into the instrument information area in the RAM 1c. Illustration of the flowchart of these steps is omitted.

What is claimed is:

1. A loop control apparatus comprising:
input means for receiving process values from a system under control;
output means for outputting manipulate values to said system under control;
a serial interface for communicating with external devices;
analytical means for performing word analysis and syntax analysis of information in the form of trains of characters which are inputted through said serial interface, and for providing output information including instrument design information and loop control function information;
memory means including an instrument information area for storing instrument parameters associated with a plurality of control elements and an operational equation area for storing said loop control function information;
control means for processing said process value in accordance with said loop control function information to provide said manipulative value to thereby perform the loop control of said system,
said analytical means including:
instrument design means providing said instrument design information for defining and registering a plurality of parameters for a plurality of control elements, assigning names of the control elements, setting control parameters and setting ranges for engineering quantities corresponding to ranges of said process values, and
operational equation design means providing said loop control function information for establishing a loop control function for said control means.

2. A loop control apparatus according to claim 1, wherein said instrument design information of said output information includes instrument information in which parameters necessary for the loop control of said system are set and said loop control function information of said output information includes operational equation information in which specific operation of said loop control of said system is set;
said instrument design means of said analytical means including an interpreter for interpreting said trains of characters to produce said instrument information and said operational equation design means of said analytical means including a compiler for compiling said trains of characters to produce said operational equation information.

3. A loop control apparatus according to claim 2, wherein said instrument design means includes means for receiving said instrument information produced by said interpreter and for storing instrument parameters in said instrument information area of said memory means.

4. A loop control apparatus according to claim 3, wherein said operational equation design means includes means for receiving said operational equation information produced by said compiler and for storing said operational equation information in said operational equation area of said memory means.

5. A loop control apparatus according to claim 2, wherein said operational equation design means includes means for receiving said operational equation information produced by said compiler and for storing said operational equation information in said operational equation area of said memory means.

* * * * *